United States Patent [19]
Lakshmikumar

[11] Patent Number: 5,631,595
[45] Date of Patent: May 20, 1997

[54] VOLTAGE SIGNAL LINE DRIVER COMPRISING A PUSH-PULL BRIDGE AMPLIFIER

[75] Inventor: Kadaba R. Lakshmikumar, Wescosville, Pa.

[73] Assignee: Lucent Technologies Inc., Murray Hill, N.J.

[21] Appl. No.: 607,619

[22] Filed: Feb. 27, 1996

Related U.S. Application Data

[63] Continuation of Ser. No. 315,723, Sep. 30, 1994, abandoned.

[51] Int. Cl.$^6$ .......................... H03K 17/14; H03K 17/687
[52] U.S. Cl. .......................... 327/362; 327/110; 327/378; 327/416; 327/513
[58] Field of Search .......................... 327/108, 110, 327/112, 409, 410, 494, 587, 588, 412, 378, 379, 389, 391, 362, 333, 415, 416, 427, 434, 437, 512, 513; 330/146, 262, 264, 265, 267, 268, 269, 273, 274, 275; 363/24, 26

[56] References Cited

U.S. PATENT DOCUMENTS

| | | | |
|---|---|---|---|
| 4,403,198 | 9/1983 | Müller | 330/265 |
| 4,569,011 | 2/1986 | Bailey | 327/110 |
| 4,820,940 | 4/1989 | Wachi et al. | 327/110 |
| 4,910,477 | 3/1990 | Gross | 330/265 |
| 5,057,701 | 10/1991 | Miller, Jr. | 327/379 |
| 5,191,297 | 3/1993 | Penman et al. | 330/146 |
| 5,272,393 | 12/1993 | Horiguchi et al. | 327/535 |
| 5,408,150 | 4/1995 | Wilcox | 327/108 |

OTHER PUBLICATIONS

ISSCC '87 Friday, Feb. 27, 1987, IEEE International Solid-State Circuits Conference, Session XXI: Telecommunication ICs, "A Monolithic Line Interface Circuit for T1 Terminals," Kenneth J. Stern, et al., Crystal Semiconductor Corp., Austin, TX, pp. 292–293.

IEEE Journal of Solid-State Crcuits, vol. 25, No. 3, Jun., 1990, "A 1.544–Mb/s CMOS Line Driver . . . " by H. Herrmann and R. Koch, pp. 760–763.

ISSCC '89/Thursday, Feb. 16, 1989, IEEE International Solid–State Circuits Conference, Session 11: Data Communication ICs, "A Single–Chip Digital Signaling Interface for the DSI Intraoffice Environment," by Jerrell P. Hein, Richard J. Starke, AT&T Bell Laboratories, Reading, PA, pp. 148–149.

Microelectronic Circuits, IC Power Amplifiers, by Adel S. Sedra, and Kenneth C. Smith, Unversity of Toronto, published by Saunders College Publishing, pp. 683–685.

AT&T Microelectronics Data Sheet, Mar. 1992, "T7290 DS1/T1/CEPT Line Interface", copyright 1992, pp. 1–20.

*Primary Examiner*—Timothy P. Callahan
*Assistant Examiner*—Terry L. Englund
*Attorney, Agent, or Firm*—Howard A. Skaist; Scott W. McLellan

[57] ABSTRACT

A line driver having two halves arranged in a push-pull configuration. Each half has a pass transistor, connected between a power supply rail and an output terminal, and an amplifier with an output coupled to the output terminal. Only one of the pass transistors conducts at any given time. A sense transistor, coupled between the power supply rail and the input of the amplifier, varies the output of the amplifier to compensate for variations in the conductivity of the conducting pass transistor. Preferably, the current density in the sense transistor is substantially the same as in the conducting pass transistor.

14 Claims, 2 Drawing Sheets

VOLTAGE SIGNAL LINE DRIVER COMPRISING A PUSH-PULL BRIDGE AMPLIFIER

This application is a continuation of application Ser. No. 08/315,723, filed on Sep. 30, 1994, now abandoned.

CROSS-REFERENCE TO RELATED APPLICATION

This patent application is being filed concurrently with patent application Ser. No. 08/315,740, entitled "Load Termination Sensing Circuit," by Lakshmikumar, filed Sep. 30, 1994, assigned to the assignee of the present invention and herein incorporated by reference.

TECHNICAL FIELD

The present invention relates to voltage signal line drivers and, more particularly, to voltage signal line drivers or voltage line drivers, such as may be employed, for example, in telecommunications.

BACKGROUND OF THE INVENTION

The use of voltage signal line drivers in telecommunications is well-known. For example, the article "A Single-Chip Digital Signaling Interface for the DS1 Intraoffice Environment," by J. P. Hein and R. J. Starke, published at the 1989 IEEE International Solid State Circuits Conference and herein incorporated by reference, describes a voltage signal line driver as part of the digital signaling interface. Other articles include "A 1.544-Mb/s CMOS Line Driver for a 22.8-Ohm Load," by H. Herrmann and R. Koch, published in the *IEEE Journal of Solid-State Circuits*, Vol. 25, No. 3, June 1990, and "A Monolithic Line Interface Circuit For T1 Terminals," by K. J. Stern, N. S. Sooch, D. J. Knapp, and M. A. Nix, published at the 1987 IEEE International Solid-State Circuits Conference, both of which are herein incorporated by reference.

In telecommunications applications, signaling standards, such as the North American DS1 standard, provide for output voltage pulses having multiple voltage levels or amplitudes substantially in accordance with a predetermined output voltage pulse template. See, for example, the AT&T-Microelectronics March 1992 Datasheet for the T7290 DS1/T1/CEPT Line Interface, herein incorporated by reference. In a low-voltage environment, such templates may be difficult to achieve at least in part due to undesirable variations in the amplitude of the output voltage signal. A need, therefore, exists for a voltage signal line driver that exhibits less variability in the output voltage signal amplitude of the output voltage signal produced by the voltage signal line driver, especially for low-voltage environments.

SUMMARY OF THE INVENTION

Briefly, in accordance with one embodiment of the invention, a voltage signal line driver comprises: a push-pull bridge amplifier circuit adapted to be coupled to a load. The bridge circuit is adapted to be driven by an electrical signal. The bridge circuit further includes an electronic circuit component adapted to be coupled to a signal path in the bridge circuit dependent on the electrical signal so as to reduce undesirable output voltage signal amplitude variations across the load. In accordance with another embodiment of the invention, an integrated circuit comprises: a push-pull bridge amplifier circuit adapted to be coupled to a load having respective first and second terminals. Two amplifier configurations and two pass (or switching) transistors are coupled to form the push-pull bridge amplifier circuit. The amplifier configurations are adapted to be driven by an electrical signal, each configuration having a signal junction coupled to one of the respective terminals of the load. Each of the pass transistors is adapted to couple one of the respective terminals of the load to a power supply, such as a voltage source. The bridge circuit further includes a sense transistor coupled so as to at least partially offset undesirable output voltage signal amplitude variations across the load due to conductivity variations in at least one of the two pass transistors. In accordance with yet another embodiment of the invention, a method of reducing undesirable variations in the amplitude of the output signal of a voltage signal line driver, the voltage signal line driver including two amplifier configurations and two pass transistors coupled so as to form a balanced line driver, comprises the steps of: amplifying an input signal by at least one of the amplifiers generating a compensation signal from a sense transistor and amplifying the compensation signal by the amplifier to compensate for variations in conductivity by the pass transistors.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof, may best be understood by reference to the following detailed description when read with the accompanying drawings in which:

DETAILED DESCRIPTION

Voltage signal line drivers are used to provide voltage signals or voltage signal pulses to be transmitted over communication lines for purposes of telecommunications. In such an environment, the voltage signal pulses provided may be transmitted over communication lines, such as copper twisted-pair wires, although the invention is, of course, not restricted in scope in this respect. Other types of communication lines may be employed with a voltage signal line driver, such as, for example, coaxial cables.

Figure 2:
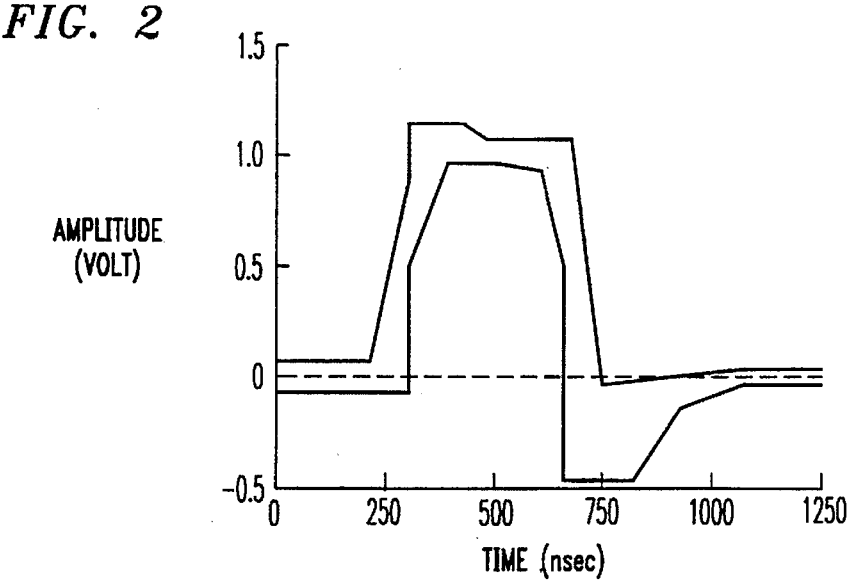
FIG. 2 is a plot illustrating the DS1 pulse shape template that may be met by a voltage signal pulse produced by an embodiment of a voltage signal line driver in accordance with the invention.

In one typical telecommunications environment, the American National Standards Institute (ANSI) has specified the DS1 pulse-shaped template, illustrated in FIG. 2, as a digital signal standard, although again the invention is not restricted in scope in this respect. For example, the CEPT pulse-shaped template or another pulse template may be employed. See, for example, ANSI Recommendation T1.102 and CCITT (Int'l Telegraph & Telephone Consultative Committee) Recommendation G.703, both of which are herein incorporated by reference. For the plot illustrated in FIG. 2, the horizontal axis corresponds to time duration measured in nanoseconds and the vertical axis corresponds to a normalized voltage level or normalized amplitude of the voltage signal pulse. In a low-voltage environment, such as with a three-volt direct current (DC) power supply, it may be difficult to consistently meet or provide a voltage signal pulse within a voltage template, such as the one illustrated in FIG. 2. This may be true for a variety of reasons, including integrated circuit processing tolerances, such as due to the statistical nature of the fabrication process, and also due to junction temperature variations occurring during circuit operation, for example. These output voltage signal variations produced by the voltage signal line driver may become particularly pronounced in a low-voltage environment where less margin for such voltage variations or anomalies is available to accomplish satisfactory circuit operation for effective communications, although the invention is not restricted in scope to a low-voltage environment. For example, it may be desirable to reduce these output voltage signal variations even when a low-voltage power supply is not employed.

Figure 1:
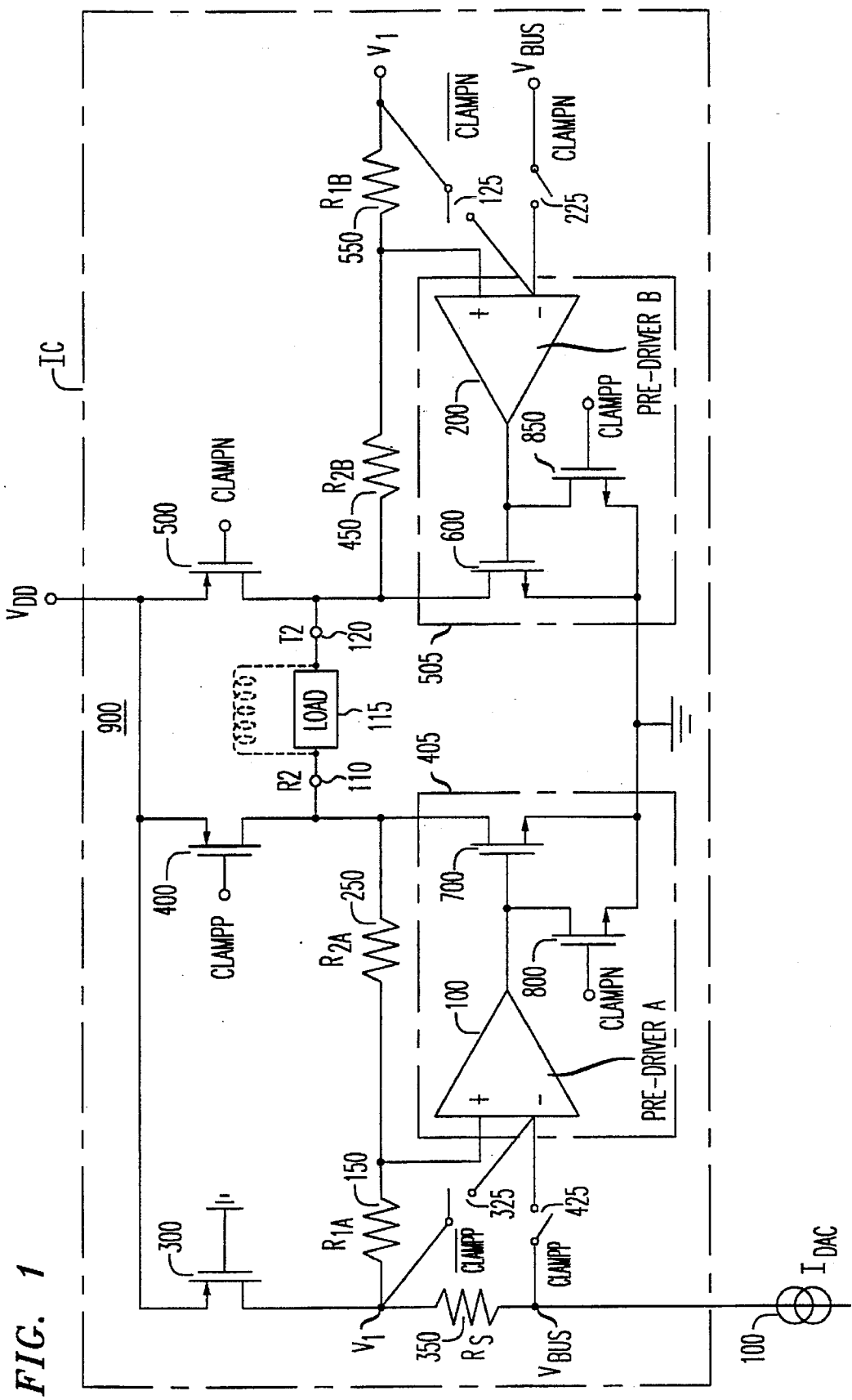
FIG. 1 is a circuit diagram of an embodiment of a voltage signal line driver in accordance with the invention.

An embodiment 900 of a voltage signal line driver in accordance with the present invention is illustrated in FIG. 1. FIG. 1 depicts the voltage signal line driver as embodied in an integrated circuit chip (IC), although the invention is not limited in scope in this respect. In the embodiment illustrated in FIG. 1, voltage signal line driver 900 comprises a push-pull bridge amplifier circuit adapted to be electrically connected to a load 115 having first and second terminals, 110 and 120, respectively. Load 115 may comprise a transformer coil, as illustrated in FIG. 1 in phantom, although the invention is not restricted in scope in this respect.

Push-pull bridge amplifier circuits are well-known in the art, such as illustrated and described in, for example, Chapter 9 of *Microelectronics Circuits*, by A. S. Sedra and K. C. Smith, 3rd Edition, available from Harcourt Brace Jovanovich College Publishers, herein incorporated by reference. Likewise, push-pull amplifier circuits are described in Chapter 18 of *Microelectronics*, by J. Millman, available from McGraw-Hill, Inc. (1979), herein incorporated by reference. In this context, the term "push-pull" amplifier circuit refers to an amplifier circuit that utilizes flow of the current in the circuit in more than one direction to obtain greater power output across the load. Typically, this circuit will therefore include two amplifiers or two amplifier configurations to accomplish the "push-pull" effect. Likewise, the term "bridge" refers to use of the load in the circuit as a bridge between corresponding signal ports or junctions of the two amplifiers or amplifier configurations. The result is to thereby effectively double the voltage swing of the output signal produced relative to a conventional amplifier circuit having a load with one terminal connected to ground.

As illustrated, voltage signal line driver 900 is adapted to be connected to a power supply, in this case a direct current (DC) voltage source, VDD, and is adapted to be driven by an electrical signal, illustrated in FIG. 1 as voltage signal ($V_1$-$V_{BUS}$). In a typical application, a transmitted voltage pulse may be pre-equalized to minimize intersymbol interference, such as illustrated by the pulse template in FIG. 2, due to transmission over a bandlimited medium or channel, although again the invention is not restricted in scope in this respect. To satisfy the previously described ANSI standard, the transmitted pulse should meet the template illustrated in FIG. 2 after traveling over twist-pair copper wires of up to 660 feet in length.

Figure 3:
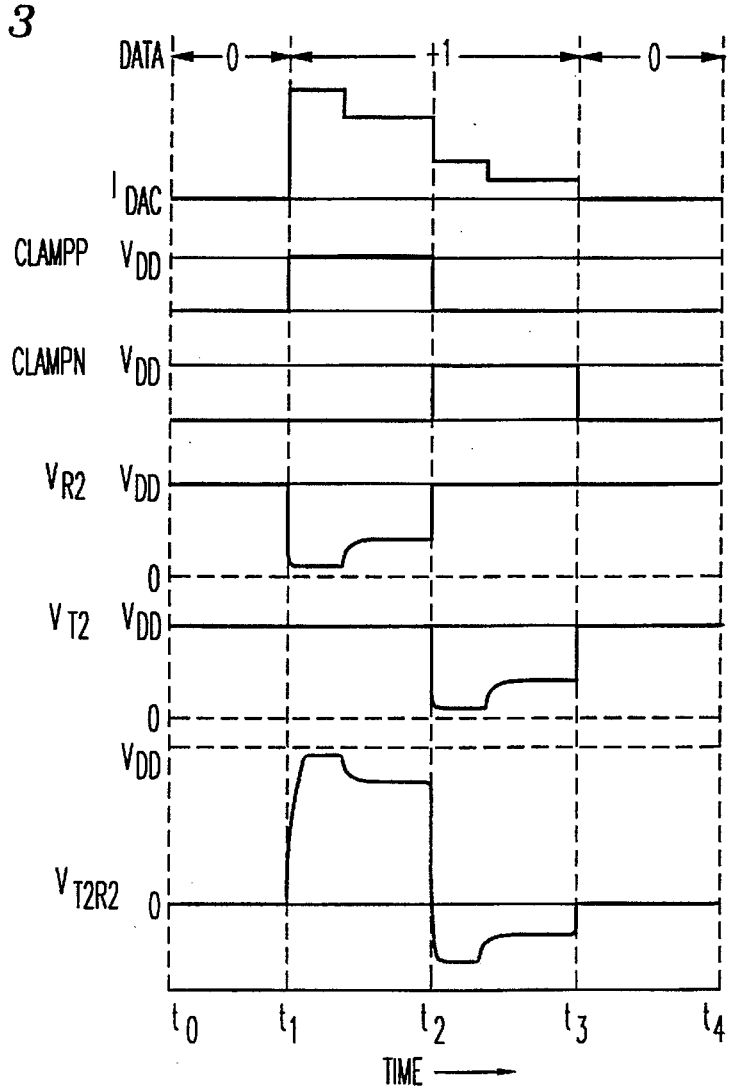
FIG. 3 is a timing diagram illustrating electrical signals associated with the embodiment of a voltage signal line driver in accordance with the invention illustrated in FIG. 1.

The operation of voltage signal line driver 900 may be illustrated by referring to the timing diagrams shown in FIG. 3. It will, of course, be appreciated that relative voltage levels and time intervals are not to scale. The sequence of circuit operations to produce a voltage pulse across load 115, for example, may be accomplished as follows. For this particular embodiment, when voltage signal line driver 900 is producing an essentially zero voltage output, such as during the time period shown in FIG. 3 as between time $t_0$ and time $t_1$, pre-driver amplifiers 100 and 200 may be biased in a low current state (not shown), as explained in more detail in aforementioned concurrently filed patent application Ser. No. 08/315,740. Thus, when digital control signals CLAMPP and CLAMPN are both "low," as illustrated in FIG. 3 between time $t_0$ and time $t_1$, terminals 120 and 110 are "pulled" in voltage towards VDD due to pass transistors 500 and 400. To produce a positive portion of a pulse, amplifier 100 may first be biased in a high current mode (not shown), such as described in aforementioned patent application Ser. No. 08/315,740. Of course, such low and high bias current mode operation need not be employed to accomplish satisfactory circuit operation in accordance with the present invention. For example, an amplifier having only one mode of operation at a substantially predetermined bias may be employed.

Next, at time $t_1$, as illustrated in FIG. 3, digital control signal CLAMPP may provide a "high" voltage signal, thereby electronically actuating switch 425 in FIG. 1 to electrically couple an input terminal of amplifier 100 to $V_{BUS}$. As illustrated in FIG. 1, digital control signal CLAMPP therefore produces an "open" circuit due to the operation of pass transistor 400, but produces a "short" circuit due to the operation of switch 425. Likewise, switch 325 will also be actuated by an inverted version of digital control signal CLAMPP. It will, of course, be appreciated that these switches may be implemented in a number of different ways, such as by CMOS transmission gates. Further, the CLAMPP signal in this example causes transistor 600 to operate as an "open" circuit. A current therefore will flow from VDD to ground via pass transistor 500, in this embodiment a CMOS p-channel transistor or semiconductor device, via load 115, and via transistor 700, an CMOS n-channel transistor or semiconductor device in this embodiment. During this period of circuit operation, the amplifier configuration 405 is operating as a linear amplifier.

Upon reaching time $t_2$, as illustrated in FIG. 3, the voltage signal line driver completes the positive portion of the output voltage pulse. At time $t_2$, amplifier 100 is decoupled from the bus providing voltage signal $V_{BUS}$ and terminal 110 is "pulled" towards VDD under digital signal control provided by signal CLAMPP.

As illustrated, the negative portion of the output voltage pulse is then produced between time $t_2$ and time $t_3$ by an approach similar to the approach just described regarding the positive portion. During this period, now amplifier configuration 505 is operating as a linear amplifier, in contrast with amplifier configuration 405 as previously described. As illustrated in this embodiment, each amplifier configuration, such as 405 and 505, comprises a folded-cascode amplifier, such as 100 or 200, with a pair of CMOS n-channel semiconductor devices, such as 700 and 800 or 600 and 850. In this embodiment, CMOS n-channel semiconductor devices are incorporated as an output driver in each amplifier configuration, although the invention is not restricted in scope in this respect. In this particular embodiment, the gate capacitance of transistors 600 and 700 provides frequency compensation for amplifier configurations 505 and 405, respectively. Likewise, the current handling capabilities of output driver transistors 600 and 700 may be relatively large in order to meet the template shown in FIG. 2 in a low-voltage environment.

One aspect of the embodiment of a voltage signal line driver in accordance with the invention, such as illustrated in FIG. 1, is that the output driver transistors are achieved with CMOS n-channel semiconductor devices. CMOS n-channel semiconductor devices typically have higher speed and current handling capability than CMOS p-channel semiconductor devices, at least in part because of the greater mobility of electrons relative to holes. This also results in a larger closed loop bandwidth where n-channel devices are used instead of p-channel devices. This additional capability may be useful in a low-voltage environment at least in part because large voltages are not available to induce large signal transitions. For the embodiment illustrated in FIG. 1, CMOS p-channel semiconductor devices are used as current sources or switches that operate under digital signal control.

This allocation of n-channel and p-channel CMOS semiconductor devices eliminates the need to improve the speed of the voltage signal line driver by pre-biasing semiconductor devices 600 and 700 at their threshold voltage when the voltage signal line driver is not driving the load. In contrast, such a pre-biasing approach is utilized, for example, in the voltage signal line driver illustrated in the previously referenced Hein and Starke article. The approach in accordance with the present invention therefore improves power efficiency relative to the pre-biasing approach. Furthermore, the CMOS n-channel semiconductor devices always operate in the saturation region and are not driven into the triode region of operation. Thus, a relatively high open loop gain for the driver results which in turn provides a pulse output within the template with more than adequate margin. A voltage signal line driver in accordance with the invention may employ CMOS n-channel devices to perform the linear drive function, as previously described, rather than CMOS p-channel devices. As illustrated in FIG. 3, to accomplish this the output voltage signals of the push-pull bridge amplifier circuit are referred to VDD, instead of being referred to ground.

Another aspect of a voltage signal line driver in accordance with the invention relates to the voltage drop across CMOS pass transistors 400 and 500. Typically, variations in this voltage drop result from conductivity variations strongly correlated to junction temperature variations occurring during circuit operation and to silicon or IC fabrication processing tolerances. The voltage drop is also signal dependent because the current though the CMOS devices is proportional to the input signal provided to amplifiers 100 and 200. For applications where the output voltage pulse has multiple voltage levels, such as for the North American DS1 standard illustrated in FIG. 2, the variability in the voltage drop across CMOS pass transistor 400 or 500 may result in unsatisfactory voltage output signals, at least with respect to the pulse template. In part because this voltage drop is across a CMOS p-channel semiconductor device, in part because the circuit current levels are relatively high for a low-voltage environment, and for other additional reasons, it is desirable to reduce and even, if possible, remove variations in the amplitude of the voltage output signal due to the voltage drop across pass transistor 400 or 500. One technique for accomplishing this may be by coupling an electronic circuit component, such as, for example, transistor or CMOS p-channel sense transistor 300 in this embodiment, in the input signal path or in a signal path dependent on the input signal. As previously indicated, the voltage drop across devices 400 and 500 is signal dependent. By matching the current density in the CMOS p-channel pass transistor for the push-pull bridge amplifier circuit, i.e., 400 or 500 in FIG. 1, to that in sense transistor 300, the variations in the voltage output signal amplitude attributable to the voltage drop across pass transistor 400 or 500 may be reduced. By this technique, an off-setting voltage drop is provided across sense transistor 300. As a result, greater consistency between output voltage pulse levels or amplitudes may be achieved. It will now be appreciated that for the embodiment illustrated in FIG. 1, the input signal provided to amplifiers 100 and 200 is provided as a current through resistor 350 illustrated in FIG. 1, resulting in a voltage across the resistor. The current is provided by a digital-to-analog converter (DAC) (not shown), although the scope of the invention is not limited in this respect. This current signal is illustrated as $I_{DAC}$ in FIG. 1 and in FIG. 3. Although not illustrated, it will, of course, be appreciated that the DAC or other current source may be provided on the same IC as the IC incorporating the voltage signal line driver.

The previously described advantage associated with employing sense transistor 300 in the push-pull bridge amplifier circuit, as shown in FIG. 1, may be illustrated by considering circuit operation in which digital control signal CLAMPP is high and digital control signal CLAMPN is low. In the circumstances just described, the following equation may be employed to describe circuit operation $$V_{R2} = V_{BUS}\left(1 + \frac{R_2}{R_1}\right) - V_1 \frac{R_2}{R_1} \tag{1}$$

where, for this embodiment, $R_2/R_1$ refers to the relative resistance value of resistor 250 to resistor 150 or resistor 450 to resistor 550. This equation describes the voltage signal at terminal 110. Equation 1 may be algebraically manipulated to provide the following equation for the voltage signal at terminal 110.

$$V_{R2} = -\left(1 + \frac{R_2}{R_1}\right) V_{in} + V_1 \tag{2}$$

Likewise, the voltage signal at terminal 120 is provided by the following equation.

$$V_{T2} = V_{1B} \tag{3}$$

where in this embodiment $V_{1B}$ is the voltage drop across semiconductor device 500 when that semiconductor device is in its triode region of operation. Combining equation (3) with equation (2) provides the following equation for the voltage drop across load 115.

$$V_{T2R2} = \left(1 + \frac{R_2}{R_1}\right) V_{in} + V_{1B} - V_1 \tag{4}$$

The last equation illustrates that by matching the current densities in sense transistor 300 and pass transistor 500, for this particular embodiment, for example, the voltage in the previous equation attributable to $V_{1B}-V_1$ may be made to approximate zero. Thus, voltage signal $V_{in}$ will appear across load 115 adjusted by a scaling factor related to the ratio of the resistance values. Sense transistor 300 essentially provides at least a partial offset to the voltage drop attributable to pass transistor 500 in this particular example. Sense transistor 300 may also provide at least a partial voltage offset to pass transistor 400 during circuit operation, such as when the digital control signals, CLAMPP and CLAMPN, switch states, such as by changing voltage amplitude levels in this embodiment. The invention is, of course, not restricted in scope to a particular signaling convention, such as the convention regarding signals CLAMPP and CLAMPN for this particular embodiment. Because, as previously explained, variations in the voltage drop across pass transistor 400 or 500 may be attributable to IC processing tolerances and temperature variations, the effect therefore is to reduce the voltage amplitude variations potentially occurring in the output voltage signal. It will now be appreciated that the advantages of a voltage signal line driver in accordance with the invention may also be realized even when transistors or other semiconductor devices in the push-pull bridge amplifier circuit, such as 400 and 500, are not operating in the triode region.

Undersirable variations in the amplitude of the output voltage signal appearing across the load of a voltage signal line driver may therefore be reduced in accordance with the following method. As previously described and illustrated in FIG. 1, a voltage signal line driver in accordance with the invention may include two amplifier configurations, such as 405 and 505, and two transistors, such as CMOS p-channel pass transistors devices 400 and 500, coupled so as to form a push-pull bridge amplifier circuit. As illustrated, the amplifier configurations have a signal port or junction electrically coupled to respective terminals of load 115. During circuit operation, as previously described, an input signal, such as $V_1$-$V_{BUS}$, and digital control signals such as CLAMPN and CLAMPP, may be provided to the bridge circuit, so that during circuit operation one of the two pass transistors, such as 400 and 500, has a voltage drop across it at any particular time dependent on the input signal. For the embodiment illustrated in FIG. 1, the particular device may have a voltage drop due to operation in its triode region. At least this one transistor or device therefore has a voltage drop that affects the output voltage signal of the voltage signal line driver. A voltage signal may be produced to at least partially offset the voltage attributable to the one of the two semiconductor devices whose voltage or voltage drop is affecting the output voltage signal of the voltage signal line driver. As previously described, this at least partially offsetting voltage signal may be provided by a transistor coupled in the input signal path or in a signal path dependent on the input signal, such as a CMOS p-channel semiconductor device, as illustrated in FIG. 1 by sense transistor 300. For example, referring to FIG. 1, during circuit operation the current densities of sense transistor 300 and either pass transistor 400 or 500, as the case may be, may be substantially matched. Therefore, the voltage drop across either pass transistor 400 or 500 may be at least partially offset by the voltage drop across sense transistor 300 so that undesirable variations in the output voltage signal amplitude of the voltage signal line driver may be reduced. Such undesirable variations include, for example, those attributable to junction temperature variations or IC processing tolerances that may affect the voltage drop across either pass transistor 400 or 500, such as when operating in the triode region in this particular embodiment.

While only certain features of the invention have been illustrated and described herein, many modifications, substitutions, changes or equivalents will now occur to those skilled in the art. It is therefore, to be understood that the appended claims are intended to cover all such modifications and changes as fall within the true spirit of the invention.

I claim:

1. In an integrated circuit, a balanced line driver has two portions, wherein the two portions are coupled to a load therebetween, each portion having:

a switching transistor, coupled between a power supply rail and an output terminal; and an amplifier responsive to an input signal applied to an input and having an output coupled to the output terminal;

wherein the balanced line driver is CHARACTERIZED BY:

a sense transistor, connected between the power supply rail and the input of the amplifiers, for compensating for variations in the conductivity of the switching transistors caused by variations in transistor characteristics.

2. The circuit recited in claim 1, wherein no more than one of the switching transistors may conduct at a time and the sense transistor is selectively coupled by a digital control signal to the amplifier which has the corresponding non-conducting switching transistor.

3. The circuit as recited in claim 2, wherein the sense transistor and the conducting switching transistor have substantially the same current density therein.

4. The circuit as recited in claim 3, wherein the switching transistors and the sense transistor are MOS transistors of the same polarity type.

5. The circuit as recited in claim 4, wherein the conducting switching transistor and the sense transistor operate in the triode region.

6. The circuit as recited in claim 5, wherein the load is coupled between the output terminals.

7. The circuit recited in claim 6, wherein the load comprises a transformer coil.

8. A method of compensating for conduction variations of a conducting switching transistor in a balanced line driver having two portions, each portion having:

a switching transistor, coupled between a power supply rail and an output terminal; and an amplifier having an input and an output, the output coupled to the output terminal;

wherein only one of the switching transistors is conducting at any one time, the other transistor being substantially non-conducting at that time;

CHARACTERIZED BY THE STEPS OF:

amplifying by one of the amplifiers an input signal applied to the input thereof;

generating a compensating signal from a sense transistor;

applying the compensating signal to the amplifier amplifying the input signal;

wherein the compensating signal is amplified by the amplifier to compensate for the variations in the conductivity of the conducting switching transistor caused by variations in transistor characteristics.

9. The method as recited in claim 8, further characterized by the step of:

decoupling the compensating signal from the amplifier having the corresponding conducting switching transistor.

10. The method as recited in claim 9, further characterized by the step of:

coupling the compensating signal to the amplifier having the corresponding non-conducting switching transistor.

11. The method as recited in claim 10, further characterized by the step of:

inhibiting the amplifier having the corresponding conducting switching transistor from amplifying.

12. The method as recited in claim 11, further characterized by the step of:

operating the conducting switching transistor and the sense transistor to have substantially the same current densities therein.

13. The method as recited in claim 12, wherein the switching transistors and the sense transistor are MOS transistors and the sense transistor is coupled between the power supply rail and the inputs of the amplifiers.

14. The method as recited in claim 13, further characterized by the step of:

operating the conducting switching transistor and the sense transistor in the triode region.

* * * * *